United States Patent
Thomas et al.

(10) Patent No.: US 8,926,855 B2
(45) Date of Patent: Jan. 6, 2015

(54) BUILDING MATERIALS, COMPOSITIONS, AND METHODS

(71) Applicant: Georgia-Pacific Gypsum LLC, Atlanta, GA (US)

(72) Inventors: Vincent B. Thomas, Bogart, GA (US); Jeffrey Thomas Fields, Suwanee, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 99 days.

(21) Appl. No.: 13/722,626

(22) Filed: Dec. 20, 2012

(65) Prior Publication Data

US 2014/0175320 A1    Jun. 26, 2014

(51) Int. Cl.
| | |
|---|---|
| *E04B 1/04* | (2006.01) |
| *C04B 24/00* | (2006.01) |
| *C04B 111/52* | (2006.01) |
| *E04F 15/20* | (2006.01) |
| *E04B 1/82* | (2006.01) |

(52) U.S. Cl.
CPC .. *E04F 15/20* (2013.01); *E04B 1/82* (2013.01)
USPC ............. 252/62; 106/708; 106/719; 106/724; 106/774; 106/778; 427/403; 52/144; 52/145; 181/290; 181/294; 181/285; 524/2; 524/456

(58) Field of Classification Search
USPC ............ 106/708, 719, 724, 774, 778; 252/62; 527/2, 456; 427/403; 52/144, 145; 181/290, 294, 285
See application file for complete search history.

(56) References Cited

U.S. PATENT DOCUMENTS

| | | | | |
|---|---|---|---|---|
| 3,424,270 A | * | 1/1969 | Hartman et al. | 181/290 |
| 3,878,278 A | * | 4/1975 | Miller et al. | 264/45.3 |
| 2002/0071947 A1 | | 6/2002 | Soane et al. | |
| 2010/0018133 A1 | | 1/2010 | Boyadjian et al. | |
| 2010/0043344 A1 | * | 2/2010 | Tada et al. | 52/745.05 |
| 2011/0051324 A1 | | 3/2011 | Ihara | |

FOREIGN PATENT DOCUMENTS

| | | |
|---|---|---|
| CN | 86100457 A | 9/1986 |
| JP | 01313351 A | 12/1989 |
| WO | 9526323 A1 | 10/1995 |
| WO | WO 95/26323 * | 10/1995 |

OTHER PUBLICATIONS

Translation for WO 95/26323, Oct. 1995.*
International Search Report and Written Opinion dated Apr. 14, 2014 (PCTUS2013/075530).

* cited by examiner

*Primary Examiner* — Carol M Koslow
(74) *Attorney, Agent, or Firm* — Ram W. Sabnis

(57) ABSTRACT

Building materials include a dampening layer which contains a plaster and a viscoelastic polymer, such as polyvinyl butyral. The dampening layer may also include a barium salt. Methods of making a sound dampening material include providing a plaster mixture. The mixture may include a viscoelastic polymer and/or a barium salt. The plaster mixture is combined with water and/or a viscoelastic polymer dispersion, to form a slurry. The slurry is applied to a surface and set to form a sound dampening layer.

34 Claims, 4 Drawing Sheets

BUILDING MATERIALS, COMPOSITIONS, AND METHODS

BACKGROUND

The present invention relates generally to the field of sound dampening materials, and more particularly to plaster-based materials having improved sound dampening properties.

Plaster-based materials are used in a variety of building and construction applications where sound dampening properties are desirable. For example, gypsum panels are used in wall, door, floor, ceiling, roof, and other building applications. In multi-family and commercial buildings, floor/ceiling assemblies commonly include plaster-based materials as part of the subfloor structure. For example, gypsum underlayments are typically applied over structural concrete or precast concrete planks in floor/ceiling assemblies to create a smooth, monolithic floor surface that delivers superior strength, sound control, and fire resistance as compared to Portland cement and other products.

To mitigate impact or airborne related noise from transferring through such structures, acoustical sound mats are commonly laid over concrete or wood subfloors. The mats are a fabric material which creates an air space between the subfloor and gypsum underlayment. The air space serves to mechanically isolate and decouple impact related vibrations. The sound mat is typically topped with a pumpable, sanded gypsum underlayment ¾ to 1 inch thick and screeded to maintain a uniform depth and finish.

However, there are drawbacks to the current system. For example, acoustical sound mats are very expensive per square foot and are time consuming and costly to install. Sound mats are also prone to shift under heavy loads and/or from hard impacts, which can cause flooring or tiles to crack. For this reason, another costly reinforcement-type mat or an even more expensive metal lathing is commonly installed overtop the sound mats before the gypsum underlayment is poured. Additionally, the acoustical mats create a mechanical air space but do little to abate sound vibrations at high to mid frequencies and must rely predominately on the mass and stiffness of the assembly for abatement of these vibrations.

Accordingly, there is a need for materials having improved sound dampening properties.

SUMMARY

In one aspect, sound dampening materials are provided, including a dampening layer which is made up of a plaster and a viscoelastic polymer, such as polyvinyl butyral. In certain embodiments, the dampening layer also includes a barium salt, such as barium sulfate.

In another aspect, methods of making a sound dampening material are provided, including providing a plaster mixture, optionally containing a viscoelastic polymer and/or a barium salt, and combining the mixture with water to form a slurry. In certain embodiments, the water includes a viscoelastic polymer dispersion. The slurry is applied to a surface and set to form a sound dampening layer.

In yet another aspect, compositions for sound dampening layers are provided, including a plaster and a viscoelastic polymer. In certain embodiments, the composition also includes a barium salt.

BRIEF DESCRIPTION OF THE DRAWINGS

Referring now to the drawings, which are meant to be exemplary and not limiting, and wherein like elements are numbered alike.

DETAILED DESCRIPTION

Figure 1:
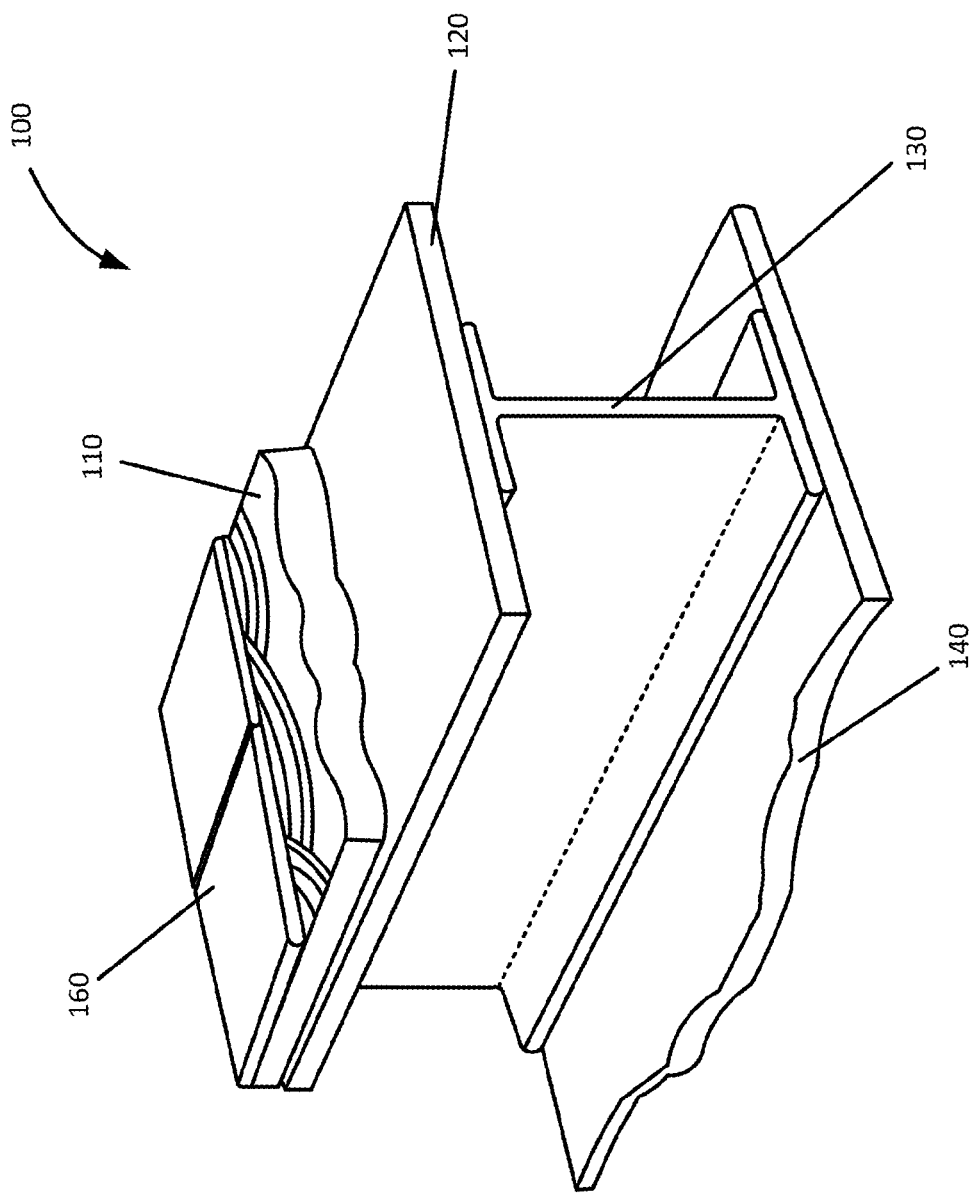
FIG. 1 is a perspective view of one embodiment of a subfloor assembly including a sound dampening layer.

Disclosed herein are materials having improved sound dampening properties, and compositions and methods for their manufacture and use. These materials may be used, for example, in building and construction applications where impact and/or airborne noise abatement is desirable, such as in doors, roofs, walls, floors, and ceilings. In certain embodiments, the sound dampening materials described herein may be used in gypsum underlayment systems, for example in floor/ceiling assemblies in multifamily or commercial buildings.

Such materials may have sound attenuation properties that meet regional or national building codes. For example, floor/ceiling assemblies may have a minimum Impact Insulation Class (IIC) rating of 50, as measured according to ASTM E989, and/or a minimum Impact Insulation Class Field rating of 45, as measured according to ASTM 1007.

In certain embodiments, a sound dampening material has a dampening layer including a plaster and a viscoelastic polymer. For example, the plaster may include alpha hemihydrate gypsum, beta hemihydrate gypsum, fine grind molding plaster, fly ash type C, Type I Portland cement, Type II Portland cement, dispersant, retarder, defoamer, boric acid, landplaster, or any combination thereof. In one embodiment, the plaster is a sanded gypsum. For example, the sand may include washed sands, masonry sands, plaster sands, and any combination thereof.

The viscoelastic polymer may be selected from the group consisting of polyvinyl butyral, acrylics, polyurethanes, vinyl ethers, ethylene vinyl acetates, styrene block copolymers, polyolefin copolymers, butyl rubber, natural rubber, silicones, and nitriles. In one embodiment, the viscoelastic polymer is polyvinyl butyral (PVB). For example, the dampening layer may include the viscoelastic polymer in an amount from about 0.5 wt. % to about 50 wt. %. In certain embodiments, the dampening layer includes the viscoelastic polymer in an amount from about 5 wt. % to about 15 wt. %.

Without being bound by a particular theory, it is believed that the viscoelastic polymer within the dampening layer undergoes plastic deformation under impact and under static loads when the layer is stressed, for example from people walking or dropping things on the floor. It is also believed that the viscoelastic polymer within the dampening layer advantageously has the ability to absorb vibrational energy as well as dissipate vibrational energy as frictional heat, thereby reducing the amount of energy transferred though the material and the amount of noise transferred to adjacent structures. Thus, the materials described herein may provide impact and airborne noise abatement, as opposed to traditional fabric sound mats, which generally provide minimal impact noise abatement.

In certain embodiments, the dampening layer also includes a barium salt. For example, the barium salt may be selected from the group consisting of barium sulfate, barium oxide, barium chloride, barium fluoride, barium sulfide, barium carbonate, barium peroxide, barium hydride, and combinations thereof. In one embodiment, the dampening layer includes a plaster, a viscoelastic polymer, and barium sulfate. In one embodiment, the dampening layer includes a viscoelastic polymer and a barium salt. For example, the dampening layer may include a barium salt in an amount from about 1 wt. % to about 70 wt. %., or in an amount from about 35 wt. % to about 55 wt. %.

In certain embodiments, the dampening layer also includes a high atomic weight material, a high molecular density material, or a combination thereof. For example, the high atomic weight material or the high molecular density material may be selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, lead powder, bismuth oxide powder, niobium powder, tantalum powder, molybdenum powder, Borated HDPE, fly ash class C, and any combination thereof.

Without being bound by a particular theory, it is believe that the barium salt and/or high atomic weight/molecular density material adds mass to the layer, which is effective to initially resist vibration, but also acts synergistically with the viscoelastic polymer to increase the dampening capacity.

For example, the dampening layers described herein may be used as sound dampening materials in floor/ceiling underlayments. In certain embodiments, a method of dampening sound through a structure includes disposing a dampening layer as described herein on a surface of or within the structure. For example, the dampening layer may include a plaster and a viscoelastic polymer. The structure may be a wall, door, floor, ceiling, roof, floor/ceiling assembly, or other building material for which sound dampening properties are desirable.

Figure 3:
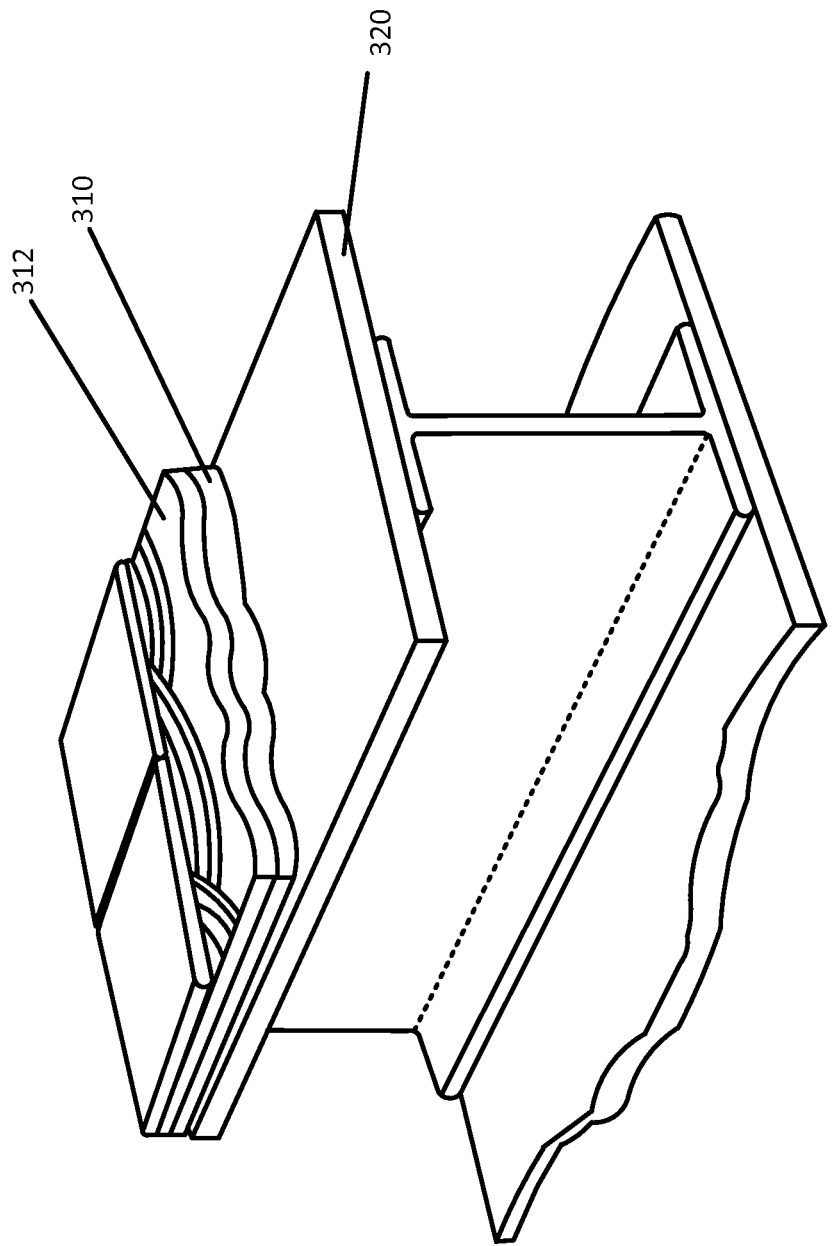
FIG. 3 is a perspective view of one embodiment of a subfloor assembly including a sound dampening layer.

The dampening layers described herein are advantageously pumpable in nature and therefore may be easily applied to a subfloor (e.g., a concrete or wood subfloor) in the field. For example, as shown in FIG. 1, a subfloor assembly 100 includes a subfloor 120 that is supported by a support beam 130 that is adjacent a plaster board 140 (e.g., a gypsum board). Dampening layer 110 may be applied on the subfloor 120 and screeded to achieve a uniform thickness and finish. The dampening layer may be utilized in place of a standard underlayment or may be used in conjunction with a standard underlayment. For example, as shown in FIG. 3, dampening layer 310 is applied to subfloor 320 and underlayment layer 312 is applied to the surface of the dampening layer 310 opposite the subfloor 320.

In certain embodiments, the dampening layer has a thickness of at least 0.03 inch. For example, the dampening layer may have a thickness of about 0.25 inch to about 1 inch. In one embodiment, the dampening layer is only as thick as is necessary to achieve a continuous layer. Any additional underlayment layer (e.g., a sanded gypsum underlayment) may have a thickness of at least 0.03 inch. For example, the underlayment layer may have a thickness of about 0.5 inch to about 1.0 inch.

The sound dampening material may have an internal friction of at least 0.004. For example, the sound dampening material may have an internal friction of about 0.005 to about 0.020. The internal friction of the sound dampening material is higher than that of traditional sound dampening materials, which advantageously allows the sound dampening material to dampen high and medium frequencies.

The sound dampening material may have an Impact Insulation Class (IIC) rating of 45 or greater. For example, the sound dampening material may have an IIC rating from 35 to 55.

Compositions for making sound dampening layers may include a plaster and a viscoelastic polymer, optionally with a barium salt, a high atomic weight, or a high molecular density material, as described above.

Methods for making the sound dampening materials described herein generally may include providing a plaster mixture, combining the mixture with water to form a slurry, applying the slurry to a surface, and setting the slurry to form a dampening layer. The plaster mixture may include alpha hemihydrate gypsum, beta hemihydrate gypsum, fine grind molding plaster, fly ash type C, Type I Portland cement, Type II Portland cement, dispersant, retarder, defoamer, boric acid, landplaster, or any combination thereof. For example, the water may be combined in an amount of about 30 wt. % to about 70 wt. %. For example, water may be added in an amount effective to bring the plaster mixture to a pumpable consistency.

In certain embodiments, the plaster mixture includes a viscoelastic polymer, such as PVB. For example, the viscoelastic polymer may be present in the mixture in an amount from about 0.5 wt. % to about 50 wt. %, or from about 5 wt. % to about 15 wt. %. In certain embodiments, PVB is in a particulate form, for example having an average particle size of about 100 nanometer to about 1000 microns. In other embodiments, the plaster mixture is combined with a viscoelastic polymer dispersion in water to form the slurry. For example, the dispersion may include polyvinyl butyral in an amount from about 1 wt. % to about 75 wt. %.

In certain embodiments, the plaster mixture includes a barium salt, a high atomic weight material, and/or a high molecular density material. For example, the high atomic weight material or the high molecular density material may be selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, lead powder, bismuth oxide powder, niobium powder, tantalum powder, molybdenum powder, Borated HDPE, fly ash class C, and any combination thereof. For example, the barium salt may be selected from the group consisting of barium sulfate, barium oxide, barium chloride, barium fluoride, barium sulfide, barium carbonate, barium peroxide, barium hydride, and combinations thereof. In certain embodiments, barium sulfate is added to the mixture in particulate form having an average particle size of 325 micron.

The slurry may be applied to a surface, for example a subfloor. For example, the slurry may be pumped onto the surface. The slurry may be allowed to set and form a dampening layer, for example by properly ventilating the layer for at least five to seven days.

In certain embodiments, the dampening layer has a thickness of at least 0.03 inch. For example, the dampening layer may have a thickness of about 0.25 inch to about 1 inch. In one embodiment, the dampening layer is only as thick as is necessary to achieve a continuous layer.

The sound dampening layer made by these methods may have an internal friction of at least 0.004. For example, the sound dampening layer may have an internal friction of about 0.005 to about 0.020.

As shown in FIG. 1, the sound dampening layer 110 may act as the sole underlayment of a subfloor assembly 100. The sound dampening layer 110 may be pumped onto the subfloor 120 and allowed to set. In such embodiments, the dampening layer may have a thickness of about 0.75 inch to about 1 inch. Flooring, such as ceramic tile 160, may be applied to the set surface of the dampening layer 110.

Figure 2:
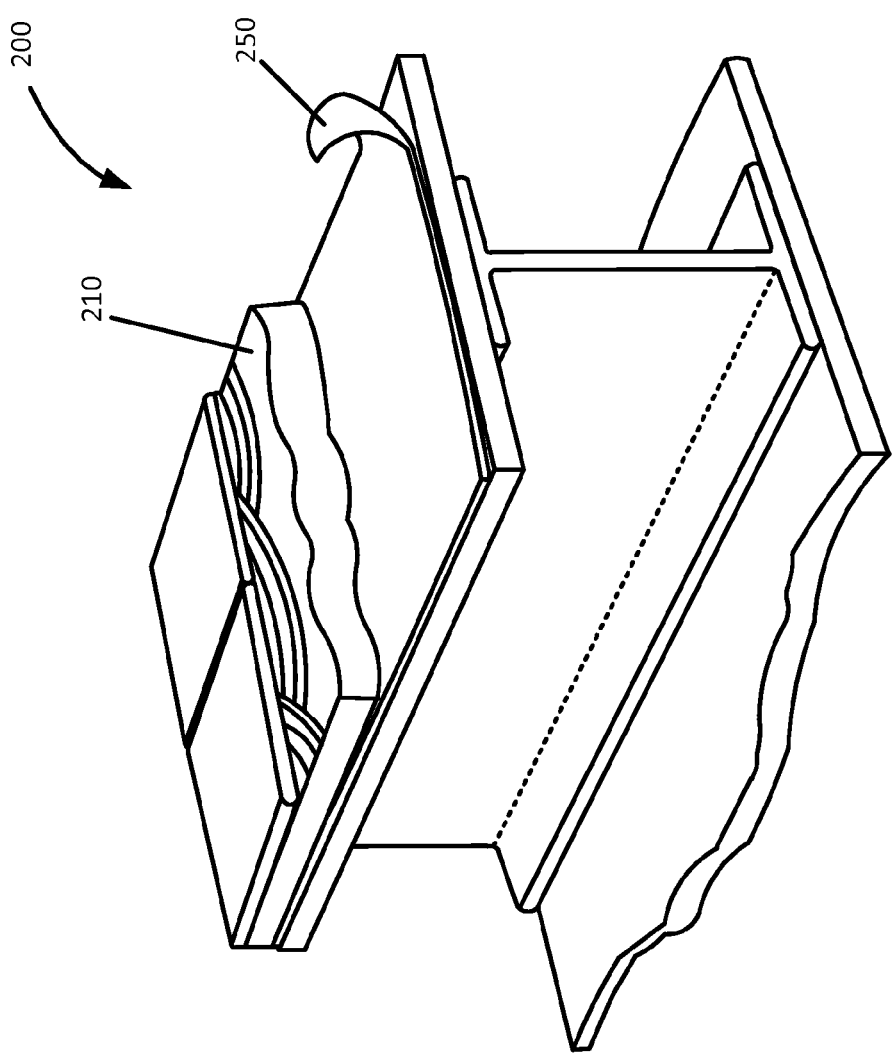
FIG. 2 is a perspective view of one embodiment of a subfloor assembly including a sound dampening layer.

As shown in FIG. 2, the sound dampening layer 210 may be applied to the surface of a sound isolation mat 250 to increase the sound dampening attributes of subfloor assembly 200. For example, the sound isolation mat may include commercially available board or roll-type sound underlayment mats, such as woven, non-woven, felt, rubber, cork, polymeric, or other mats.

As shown in FIG. 3, the dampening layer 310 may applied to subfloor 320 and an underlayment layer 312 may be applied to the surface of the dampening layer 310 opposite the subfloor 320. In such embodiments, the dampening layer may have a thickness of about 0.25 inch to about 0.5 inch. The additional underlayment layer (e.g., a pumpable sanded gypsum underlayment) may have a thickness of at least 0.03 inch. For example, the underlayment layer may have a thickness of about 0.5 inch to about 1.0 inch. After application to the dampening layer, a plaster underlayment slurry may be allowed to set to form a plaster underlayment.

The sound dampening material may cause the subfloor assembly to have an Impact Insulation Class (IIC) rating of 45 or greater. For example, the subfloor assembly may have an IIC rating from 35 to 55.

EXAMPLES

Embodiments of the dampening materials disclosed herein were manufactured and tested for sound dampening properties. The results are shown in FIGS. 4, 5, and 6.

Tests were conducting using a Buzzsonic 5.9 instrument designed to test solid materials by the Impulse Excitation Technique (IET). Specifically, the device measures and analyzes vibrational responses of impulse excited solids, such as ceramics, metals, composites, polymers, building products, paper board, etc.

Sound dampening material 4" by 4" test samples were prepared as described below. The samples were tested as a single or layered construction and placed across a span of thin nylon threads, which reduce external damping. The samples were then tapped lightly with a small hammer, thereby generating a standing wave in the solid. The resulting sound was captured with a microphone directly underneath the sample and attached to a computer that analyzes the sound using a Fast Fourier Transform algorithm. The waveform and power/frequency spectrum of the sound were determined, from which the damping properties and resonant frequencies were calculated. The peak amplitude of vibrations of an impulse-excited solid follows an exponential decay. The damping ratio, which determines system damping capacity, and the internal friction of the material $Q^{-1}$ (obtained from the damping ratio) were used in evaluating materials. The internal friction calculated from the waveform exponential decay curve was used as the primary means of differentiating between samples.

Figure 4:
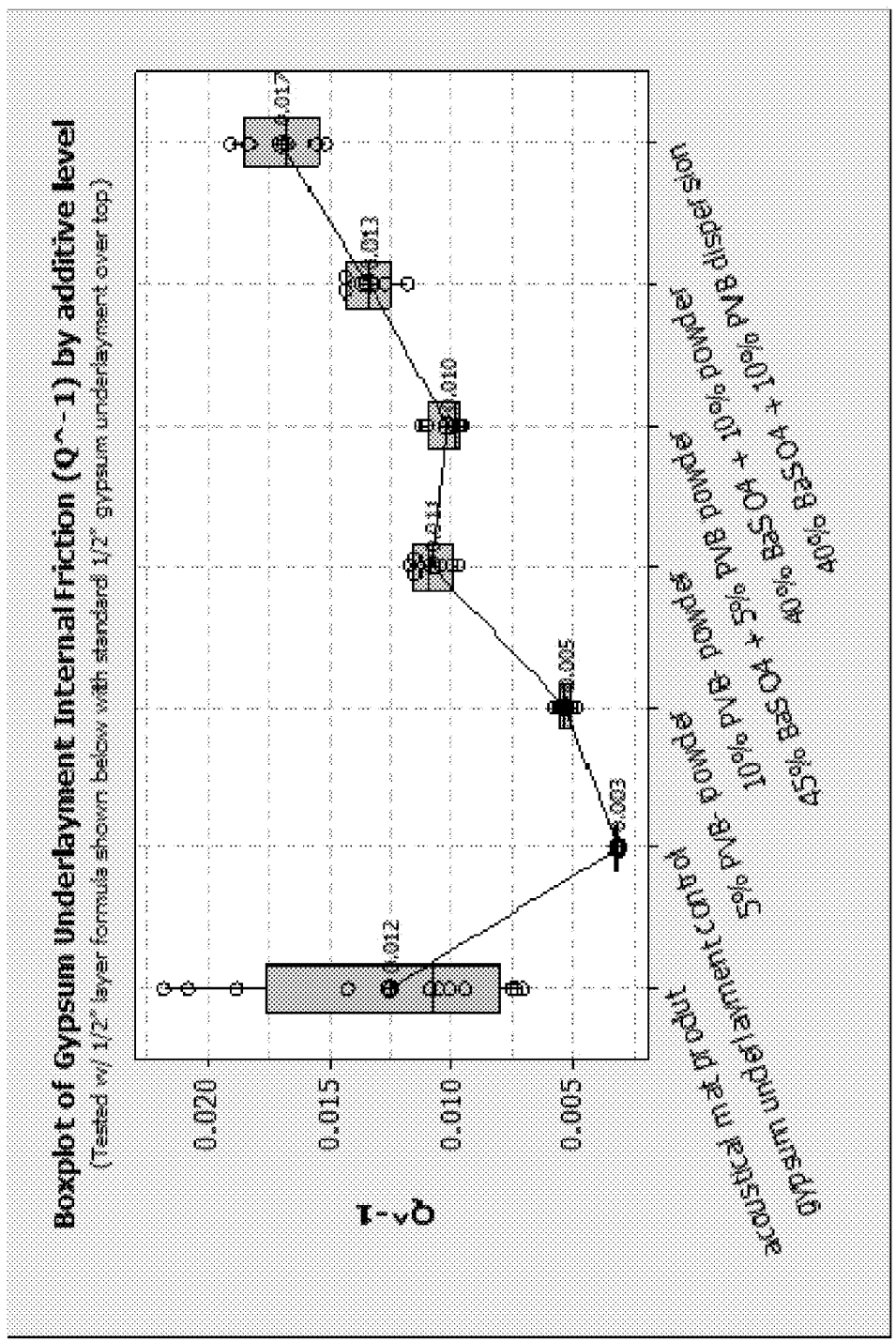
FIG. 4 is a chart illustrating the internal friction damping of certain embodiments of sound dampening materials.

FIG. 4 shows the results obtained from single ½" sound dampening layers with a ½" standard underlayment layer over the acoustical mat product. Results are shown as ANOVA boxplots with mean connecting lines. For each condition, the box portion of the box plot is divided into quartile sections. The box shows 50% of the response for that condition with the outer two quartiles as whiskers and showing the remaining uppermost and lowermost quartiles of responses.

The ACOUSTIMAT products range includes the combined results of ACOUSTIMAT II and ACOUSTIMAT III products (commercially available from Maxxon Corporation, located in Hamel, Minn.), which include a non-woven fabric mat and a standard gypsum underlayment, such as DURA-CAP (commercially available from Maxxon Corporation). The ACOUSTIMAT products range represents the current sound dampening characteristics of dampening materials incorporating sound mats. A DURA-CAP panel was also tested as a comparative control. DURA-CAP plaster was used as the plaster base for the dampening layer samples.

FIG. 4 shows the damping ability ($Q^{-1}$) of the tested samples. A higher $Q^{-1}$ indicates a higher damping ability. The first dampening layer sample included DURA-CAP gypsum plaster and 5 wt. % PVB added as a 400 micron powder (commercially available from Shark Solutions LTD, located in Denmark) and clearly outperformed the standard DURA-CAP underlayment and fell within the lower performance end of the sound mat comparative samples. As more PVB powder was added up to 10 wt. %, the amount of dampening went up incrementally.

Barium sulfate was added to the plaster and PVB formulations, and these samples outperformed the samples having only PVB, especially at a ratio of 40 wt. % barium sulfate to 10 wt. % PVB. In the final sample, a dispersion of PVB (commercially available from Shark Solutions LTD) was added to the make-up water, which was then combined with the barium sulfate and plaster. This sample performed the best of all the samples. Without being bound by a particular theory, it is believed that the superior performance of the dispersion is due to the particle size and better distribution of the PVB in the ultimate matrix. However, PVB dispersants may interfere with the water demand and ultimately finished strength properties.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sound dampening material, comprising:
   a dampening layer which comprises a plaster and a viscoelastic polymer,
   wherein the viscoelastic polymer comprises polyvinyl butyral.

2. The sound dampening material of claim 1, wherein the dampening layer comprises polyvinyl butyral in an amount from about 0.5 wt. % to about 50 wt. %.

3. The sound dampening material of claim 1, wherein the dampening layer comprises polyvinyl butyral in an amount from about 5 wt. % to about 15 wt. %.

4. A sound dampening material, comprising:
   a dampening layer which comprises a plaster and a viscoelastic polymer,
   wherein the dampening layer further comprises a high atomic weight material, a high molecular density material, or a combination thereof.

5. The sound dampening material of claim 4, wherein the high atomic weight material or the high molecular density material is selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, lead powder, bismuth oxide powder, niobium powder, tantalum powder, molybdenum powder, Borated HDPE, fly ash class C, and any combination thereof.

6. A sound dampening material, comprising:
   a dampening layer which comprises a plaster, a barium salt, and a viscoelastic polymer.

7. The sound dampening material of claim 6, wherein the viscoelastic polymer comprises polyvinyl butyral.

8. The sound dampening material of claim 6, wherein the viscoelastic polymer is selected from the group consisting of polyvinyl butyral, acrylics, polyurethanes, vinyl ethers, ethylene vinyl acetates, styrene block copolymers, polyolefin copolymers, butyl rubber, natural rubber, silicones, and nitriles.

9. The sound dampening material of claim 6, wherein the barium salt comprises barium sulfate.

10. The sound dampening material of claim 6, wherein the barium salt is selected from the group consisting of barium sulfate, barium oxide, barium chloride, barium fluoride, barium sulfide, barium carbonate, barium peroxide, barium hydride, and combinations thereof.

11. The sound dampening material of claim 6, wherein the dampening layer further comprises a high atomic weight material, a high molecular density material, or a combination thereof.

12. The sound dampening material of claim 11, wherein the high atomic weight material or the high molecular density material is selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, lead powder, bismuth oxide powder, niobium powder, tantalum powder, molybdenum powder, Borated HDPE, fly ash class C, and any combination thereof.

13. The sound dampening material of claim 7, wherein the dampening layer comprises polyvinyl butyral in an amount from about 0.5 wt. % to about 50 wt. %.

14. The sound dampening material of claim 7, wherein the dampening layer comprises polyvinyl butyral in an amount from about 5 wt. % to about 15 wt. %.

15. The sound dampening material of claim 6, wherein the dampening layer comprises barium salt in an amount from about 1 wt. % to about 70 wt. %.

16. The sound dampening material of claim 6, wherein the dampening layer comprises barium salt in an amount from about 35 wt. % to about 55 wt. %.

17. The sound dampening material of claim 6, wherein the plaster comprises alpha hemihydrate gypsum, beta hemihydrate gypsum, fine grind molding plaster, fly ash type C, Type I Portland cement, Type II Portland cement, dispersant, retarder, defoamer, boric acid, landplaster, or any combination thereof.

18. The sound dampening material of claim 6, wherein the dampening layer has an internal friction of at least 0.004.

19. The sound dampening material of claim 6, wherein the material has an Impact Insulation Class rating of 45 or greater.

20. The sound dampening material of claim 6, wherein the dampening layer has a thickness of at least 0.03 inch.

21. The sound dampening material of claim 6, wherein the plaster comprises a sanded gypsum.

22. The sound dampening material of claim 21, wherein the sanded gypsum comprises sand selected from the group consisting of washed sands, masonry sands, plaster sands, and any combination thereof.

23. A method of making a sound dampening material, comprising:
providing a plaster and a viscoelastic polymer mixture;
combining the mixture with water to form a slurry;
applying the slurry to a surface;
setting the slurry to form a dampening layer,
wherein the viscoelastic polymer comprises polyvinyl butyral.

24. The method of claim 23, wherein polyvinyl butyral is present in the mixture in an amount from about 0.5 wt. % to about 50 wt. %.

25. The method of claim 23, wherein polyvinyl butyral is present in the mixture in an amount from about 5 wt. % to about 15 wt. %.

26. The method of claim 23, wherein the polyvinyl butyral is in particulate form.

27. The method of claim 26, wherein the polyvinyl butyral has an average particle size of about 100 nanometer to about 1000 microns.

28. A method of making a sound dampening material, comprising:
providing a plaster and a viscoelastic polymer mixture;
combining the mixture with water to form a slurry;
applying the slurry to a surface;
setting the slurry to form a dampening layer,
wherein the mixture comprises a high atomic weight material, a high molecular density material, or a combination thereof.

29. The method of claim 28, wherein the high atomic weight material or the high molecular density material is selected from the group consisting of barium sulfate, calcium silicate, zinc oxide, lead, zirconium dioxide, carbonyl iron powders, aluminum powder, iron powder, stainless steel powder, copper powder, bismuth powder, tungsten powder, lead powder, bismuth oxide powder, niobium powder, tantalum powder, molybdenum powder, Borated HDPE, fly ash class C, and any combination thereof.

30. A method of making a sound dampening material, comprising:
providing a plaster and a viscoelastic polymer mixture;
combining the mixture with water to form a slurry;
applying the slurry to a surface;
setting the slurry to form a dampening layer;
applying a plaster underlayment slurry onto an exposed surface of the dampening layer; and
setting the plaster underlayment slurry to form a plaster underlayment.

31. The method of claim 30, wherein the dampening layer has a thickness of at least 0.03 inch and the plaster underlayment has a thickness of at least 0.03 inch.

32. A method of making a sound dampening material, comprising:
providing a mixture comprising a plaster, a viscoelastic polymer, and a barium salt;
combining the mixture with water to form a slurry;
applying the slurry to a surface; and
setting the slurry to form a dampening layer.

33. A method of making a sound dampening material, comprising:
combining a viscoelastic polymer dispersion in water and a plaster to form a slurry;
applying the slurry to a surface; and
setting the slurry to form a dampening layer,
wherein the dispersion comprises polyvinyl butyral in an amount from about 1 wt. % to about 75 wt. %.

34. A method of making a sound dampening material, comprising:
providing a plaster and barium salt mixture;
combining the mixture and a viscoelastic polymer dispersion in water to form a slurry;
applying the slurry to a surface; and
setting the slurry to form a dampening layer.

* * * * *